(12) United States Patent
Flippin (10) Patent No.: US 11,897,740 B2
(45) Date of Patent: Feb. 13, 2024

(54) EXPANDABLE CAR JACK

(71) Applicant: CrossJack LLC, Cleveland, OH (US)

(72) Inventor: James Alford Flippin, Cleveland, OH (US)

(73) Assignee: CROSSJACK LLC, Cleveland, OH (US)

( * ) Notice: Subject to any disclaimer, the term of this patent is extended or adjusted under 35 U.S.C. 154(b) by 0 days.

(21) Appl. No.: 18/089,188

(22) Filed: Dec. 27, 2022

(65) Prior Publication Data

US 2023/0137494 A1     May 4, 2023

Related U.S. Application Data

(62) Division of application No. 17/462,229, filed on Aug. 31, 2021, now Pat. No. 11,535,500.

(51) Int. Cl.
    *B66F 3/12*           (2006.01)
    *B66F 13/00*         (2006.01)
    (Continued)

(52) U.S. Cl.
    CPC .............. *B66F 3/12* (2013.01); *B62B 5/0083* (2013.01); *B66F 13/00* (2013.01);
    (Continued)

(58) Field of Classification Search
    CPC ..................................... B66F 3/12; A47B 3/00
    (Continued)

(56) References Cited

U.S. PATENT DOCUMENTS

| | | |
|---|---|---|
| 1,887,924 A | 11/1932 | Evans |
| 1,982,642 A | 12/1934 | Curok |
| | (Continued) | |

OTHER PUBLICATIONS

CrossJack—Innovative Safe Car Jack (Year: 2020).*
Flippin, Dr. J. Alford, "CrossJack, A Revolutionary Car Jack", Feb. 26, 2020.

*Primary Examiner* — Mahdi H Nejad
(74) *Attorney, Agent, or Firm* — The Concept Law Group, PA; Scott D. Smiley; Scott M. Garrett (57) ABSTRACT

An expandable car jack includes a vehicle lifting assembly with an upper lifting member, a lower lifting member mechanically coupled to the upper lifting member, and a lifting mechanism capable of moving the upper lifting member to a plurality of raised height positions. A base is coupled to the vehicle lifting assembly and includes a first base support member, a second base support member, and a base support coupler that is operable to selectively couple the first base support member to the second base support member in at least a first coupling position and a second coupling position. The base support coupler selectively mechanically maintains a parallel alignment and a perpendicular alignment of the first base support member and the second base support member when the base support coupler is in the first coupling position, allows the first base support member and the second base support member to freely move between the parallel alignment and the perpendicular alignment when the base support coupler is in the second coupling position, and remains mechanically coupled to at least the first base support member in the first and second coupling positions so that the first base support member cannot move with respect to the second base support member (Continued)

without a mechanical alteration to the base support coupler prior to moving either the first base support member or the second base support member.

8 Claims, 8 Drawing Sheets

(51) Int. Cl.
  *B62B 5/00* (2006.01)
  *B66F 3/22* (2006.01)
(52) U.S. Cl.
  CPC ............ *B62B 2205/06* (2013.01); *B66F 3/22* (2013.01); *Y10S 254/01* (2013.01)
(58) Field of Classification Search
  USPC ..................................... 211/132.1; 248/346.3
  See application file for complete search history.

(56) References Cited

U.S. PATENT DOCUMENTS

| | | | |
|---|---|---|---|
| 2,189,687 A * | 2/1940 | Andrew | A47G 33/12 248/528 |
| 2,493,978 A | 1/1950 | Kromer | |
| 2,572,205 A | 10/1951 | Shanks | |
| 2,580,743 A | 1/1952 | Eckels | |
| 2,616,650 A | 11/1952 | Thompson | |
| 1,903,341 A | 4/1953 | Mitchell | |
| 3,117,764 A | 1/1964 | Schultz et al. | |
| 3,831,959 A | 8/1974 | Fontana | |
| 3,920,212 A | 11/1975 | Westwood | |
| 3,923,318 A | 12/1975 | Renard et al. | |
| 3,970,278 A | 7/1976 | Studer | |
| 4,245,808 A | 1/1981 | John | |
| 4,712,758 A * | 12/1987 | Cuschera | F16M 11/42 248/188.7 |
| 4,743,039 A | 5/1988 | Ellis | |
| 5,915,672 A | 6/1999 | Dickey | |
| 6,234,451 B1 | 5/2001 | Baron | |
| 6,581,908 B1 | 6/2003 | Francis | |
| 6,644,615 B1 | 11/2003 | Liu | |
| 6,964,423 B1 | 11/2005 | Chieh et al. | |
| 7,644,896 B1 | 1/2010 | Niner | |
| 8,109,476 B2 | 2/2012 | Roberts et al. | |
| 8,398,056 B1 | 3/2013 | Morrison | |
| 8,684,372 B2 | 4/2014 | Buttazzoni et al. | |
| 8,876,071 B2 * | 11/2014 | Brooke | A47B 91/16 248/188.8 |
| 9,103,493 B2 | 8/2015 | Klinzmann | |
| 9,868,620 B1 | 1/2018 | Flippin | |
| D955,084 S * | 6/2022 | Li | D34/31 |
| 11,535,500 B1 * | 12/2022 | Flippin | B66F 3/25 |
| 2004/0173996 A1 | 9/2004 | Anderson | |
| 2005/0017223 A1 | 1/2005 | Lucas | |
| 2005/0211868 A1 * | 9/2005 | Scott | E01F 9/692 248/688 |
| 2010/0001160 A1 * | 1/2010 | Ahn | B60B 33/0028 248/346.01 |
| 2010/0288454 A1 * | 11/2010 | Lin | A47H 5/04 160/368.1 |
| 2012/0045292 A1 * | 2/2012 | Kaye | F16B 13/0808 411/15 |
| 2016/0340164 A1 | 11/2016 | Koteski et al. | |
| 2017/0369289 A1 * | 12/2017 | Flippin | B66F 13/00 |

\* cited by examiner

EXPANDABLE CAR JACK

CROSS REFERENCE

This application is a divisional application of U.S. patent application Ser. No. 17/462,229, filed Aug. 31, 2021, the entirety of which is hereby incorporated by reference.

FIELD OF THE INVENTION

The present invention relates generally to vehicle jacks, and, more particularly, relates to bases used in junction with car jacks.

BACKGROUND OF THE INVENTION

Mechanical devices used to lift heavy loads (commonly referred to as "jacks") are well known and used for a variety of different applications, including vehicle maintenance and repairing or changing tires, among other things. A common jack employed by many vehicle manufacturers is the "scissor" jack, or a jack utilizing threading or "jackscrew" that causes lifting arms to pivot and raise or lower a lifting surface on the scissor jack depending on the rotation of the jackscrew. The scissor jack has been used for decades and is desirous for many vehicle manufacturers because it is generally reliable, generally maintenance free, and relatively compact when placed in a collapsed (non-lifting) position.

One significant problem with vehicle jacks, particularly scissor jacks, is the lack of stability when placed in a raised (lifting) position. This lack of stability generates an unsafe environment for users of the jacks, leading to many injuries and even fatalities over the years. The lack of stability and increased chance for user injury is exacerbated when the vehicle jack is utilized in combination with an unstable or uneven ground surface upon which the jack rests. Over the years, there have been some advances to increase stability and reduce injuries. These advances, however, have their own associated disadvantages.

A few well-known methods and devices utilized to increase stability include the use of one or more "jack stands", telescoping bases, collapsible bases, and other applicable features. However, the aforementioned configurations and associated features suffer from similar issues such as, but not limited to lack of ability to generate stable surfaces for the car jack to rest on that simultaneously eliminate any wobbling or other movements of the jack. For example, U.S. Pat. No. 1,982,642 discloses a lifting jack including a nested jack base configured to come into contact with a surface serving as the foundation of support for the lifting jack. However, an apparent flaw with the lifting jack is that due to the design and configuration of the nested jack base there is a significant lack of contact points between the base and the surface. This can be a major issue when attempting to stabilize the weight of a car on an uneven surface, which upon exposure to any unexpected forces will result in the vehicle moving or even possibly falling off of the lifting jack entirely.

Therefore, a need exists to overcome the problems with the prior art as discussed above. In particular, what is needed is an expandable carjack designed to support multiple configurations while allowing the carjack to be in direct and stable contact with both stable and unstable surfaces.

SUMMARY OF THE INVENTION

The invention provides an expandable car jack base that overcome the herein aforementioned disadvantages of the heretofore-known devices.

Although the invention is illustrated and described herein as embodied in an expandable car jack base, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

With the foregoing and other objects in view, there is provided, in accordance with the invention, an expandable car jack that includes a vehicle lifting assembly including an upper lifting member; a lower lifting member mechanically coupled to the upper lifting member; a lifting mechanism capable of moving the upper lifting member to a plurality of raised height positions; and a base coupled to the vehicle lifting assembly, the base including: a first base support member; a second base support member; and a base support coupler operable to selectively couple the first base support member to the second base support member in at least a first coupling position and a second coupling position, wherein the base support coupler selectively: mechanically maintains a parallel alignment and a perpendicular alignment of the first base support member and the second base support member when the base support coupler is in the first coupling position; allows the first base support member and the second base support member to freely move between the parallel alignment and the perpendicular alignment when the base support coupler is in the second coupling position; and remains mechanically coupled to the first base support member in the first and second coupling positions so that the first base support member cannot move with respect to the second base support member without a mechanical alteration to the base support coupler prior to moving either the first base support member or the second base support member.

In accordance with a further feature of the present invention, the first and second base support members include threads sized to mate with corresponding threads on the base support coupler.

In accordance with a further feature of the present invention, in some embodiments, the base support coupler includes a head; a foot; and a length separating the head and the foot, the length having a threaded section and an unthreaded section.

In accordance with a further feature of the present invention, the first base support member and the second base support member each define an aperture therein and the foot of the base support coupler has a dimension that is larger than the apertures.

In accordance with a further feature of the present invention, the first base support member provides stability to the vehicle lifting assembly in a first and a second vector when in the second coupling position; and the second base support member provides stability to the vehicle lifting assembly in a third and a fourth vector when in the second coupling position, the first and second vectors being substantially perpendicular to the third and fourth vectors.

With the foregoing and other objects in view, there is provided, in accordance with the invention, a method for utilizing an expandable car jack including disengaging a base support coupler from a first base support member; rotating the first base support member with respect to a second base support member from a parallel alignment to a perpendicular alignment; and mechanically engaging the base support coupler with the first base support member so that the base support coupler prevents the first base support member from rotating with respect to the second base support member.

In accordance with a further feature of the present invention, the aforementioned method further includes disengaging the base support coupler from the first base support member; rotating the first base support member with respect to a second base support member from the perpendicular alignment to the parallel alignment; mechanically engaging the base support coupler with the first base support member so that the base support coupler prevents the first base support member from rotating with respect to the second base support member.

In accordance with a further feature of the present invention, the aforementioned method further includes lifting, via a lifting mechanism, the upper lifting member to a plurality of raised height positions; wherein the base support coupler mechanically maintains the parallel alignment of the first base support member and the second base support member when the first base support member and the second base support member are in the first coupling position; and wherein the base support coupler mechanically maintains the perpendicular alignment of the first base support member and the second base support member when the first base support member and the second base support member are in the second coupling position.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the jack spanning from a first end to a second end when the jack is in a collapsed position. As described herein, the term "perpendicular" should be understood to mean perpendicular to the longitudinal direction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient expandable car jack configured to include a vehicle lifting assembly, a base having base support members coupled to the vehicle lifting assembly, and a base support coupler. Embodiments of the invention provide lifting members and a lifting mechanism configured to raise and lower the expandable car jack at a plurality of heights while the base supports various coupling positions configured to provide the optimal configuration for safely and securely retaining a vehicle while on the expandable car jack. For example, embodiments of the invention provide mechanisms for the base support coupler to mechanically maintain a first coupling position in which the base support members are aligned in a parallel manner (longitudinal manner if the jack is in a collapsed state) or perpendicularly in a locked and secured manner via the base coupler, and a second coupling position in which the base support members are bound in a configuration in which they move freely vertically respective to the base coupler. In addition, the base support members are configured to be detachably affixed to each other via the base support coupler in the first coupling position. In both coupling positions the base support coupler interlaces through apertures of each the base support members while a planar surface of the bottommost base support member is configured to be in direct contact with the surface stabilizing the expandable car jack. Thus, the expandable car jack and supporting methods significantly reduce the amount of risks and hazards associated with stabilizing a vehicle on a car jack regardless of the surface in direct contact with the bottommost base support member being stable or unstable.

Figure 1:
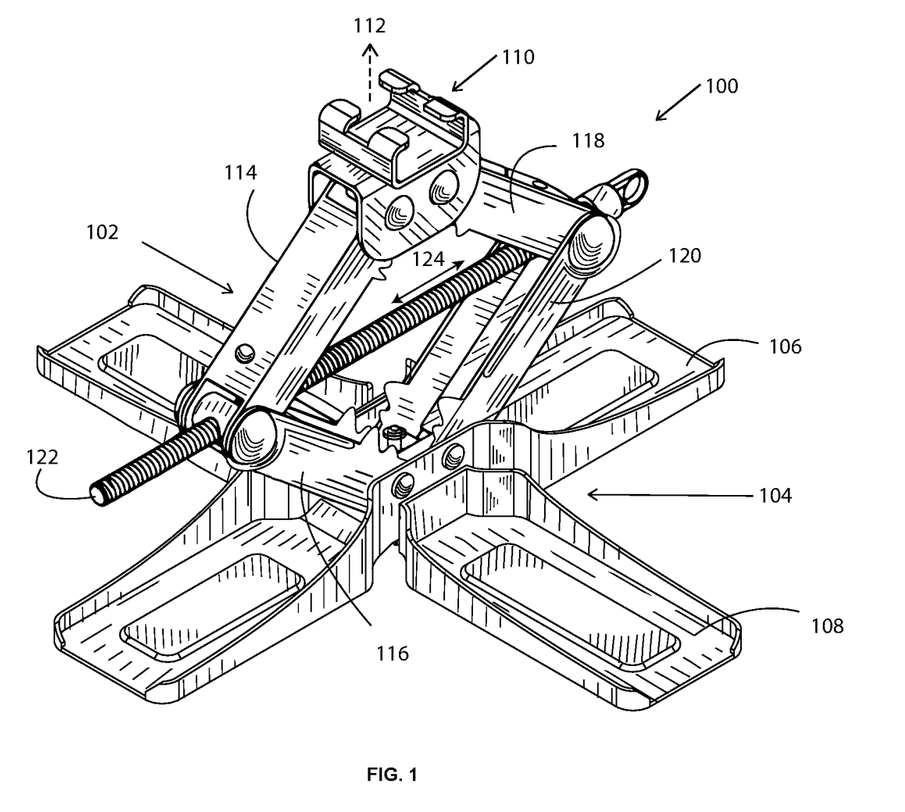
FIG. 1 is a perspective view of an expandable car jack with a base in a perpendicular position, according to an example embodiment.

Referring now to FIG. 1, an expandable car jack 100 is depicted in a perspective downward-looking view, according to an exemplary embodiment. In one embodiment, jack 100 includes a vehicle lifting assembly 102 coupled to an expandable base 104. In some embodiments, expandable base 104 includes a first base support member 106 and a second base support member 108 wherein base support members 106 and 108 are configured to be assembled together via an inventive base support coupler 200, which is shown in detail in FIGS. 2-5 and will be described in detail below. It is to be understood that base support members 106 and 108 are configured to be rotatably connected to each other by the base support coupler, allowing the lower ground contacting supporting area of car jack 100 to be increased, which provides enhanced support for the raising and lowering of vehicle lifting assembly 102. The increase in supporting area reduces opportunity for forces to cause jack 100 to tilt or collapse, particularly in situations where the surface in contact with the bottommost base support member is uneven.

In some embodiments, vehicle lifting assembly 102 includes a lifting surface 110 configured to be raised to a plurality of heights respective to a contact point in which the bottommost base support member of base support members 106 and 108 is in direct contact with the applicable underlying surface. In some embodiments, base support members 106 and 108 are configured to be interchangeable. Arrow 112 indicates the translating capabilities of lifting surface 110 in which in a preferred embodiment, the movement to the plurality of raised height positions is a vertical movement that correlates to arrow 112. In some embodiments, vehicle lifting assembly 102 may further include a plurality of hinged members 114, 116, 118, and 120 in which each hinged member 114, 116, 118, and 120 is configured to be coupled by a screw 122. It is to be understood that the screw 122 may be one or more screws, nuts/bolts, or the like; however, the screw 122 is configured to expand or reduce a width 124 spacing the plurality of hinged members 114, 116, 118, and 120 from each other.

Base support members 106 and 108 are configured to support vehicle lifting assembly 102 in lifting the lifting surface 110 in order to transition through the plurality of raised heights determined based upon both the amount and direction of force applied by the user to screw 122. In one embodiment, screw 122 is a spindle and spindle mount combination configured to receive torque movements from the user in order to extend or retract the height of vehicle lifting assembly 102 resulting in width 124 being adjusted accordingly. For example, if the user applies a clockwise torque movement to screw 122, then lifting surface 110 translates upward in accordance with arrow 112 resulting in plurality of hinges 114, 116, 118, and 120 scaling and/or contracting inward towards each other reducing width 124. If the user applies a counterclockwise torque movement to screw 122, then lifting surface 110 translates downward resulting in plurality of hinges 114, 116, 118, and 120 expanding outwards away from each other increasing width 124. In some embodiments, expandable base 104 may be utilized with hydraulic lifts or other pneumatic lifting assemblies to generate the lifting force necessary to translate lifting surface 110 upward to raise a vehicle.

It is to be understood that FIG. 1 shows several advantageous features of the present invention, but, as will be described below, the invention can be provided in several shapes, sizes, combinations of features and components, and varying numbers and functions of the components. For example, lifting surface 110 may be any applicable mechanism configured to facilitate the raising and lowering of lifting assembly 102 in a secure manner. It is to be understood that jack 100 is configured to be transportable and further configured to be composed of carbon steel, stainless steel, aluminum, titanium, composites, ceramics, polymeric materials such as polycarbonates, such as acrylonitrile butadiene styrene (ABS plastic), Lexan™, Makrolon™, or any combination thereof. It is also to be understood that FIG. 1 depicts base support members 106 and 108 in a first coupling position which is sustained by a base support coupler, wherein the first coupling position is a locked and secured position assuring retention of the position of base support members 106 and 108 configured to sustain placement of the vehicle on lifting surface 110 for raising to the plurality of heights.

Figure 2:
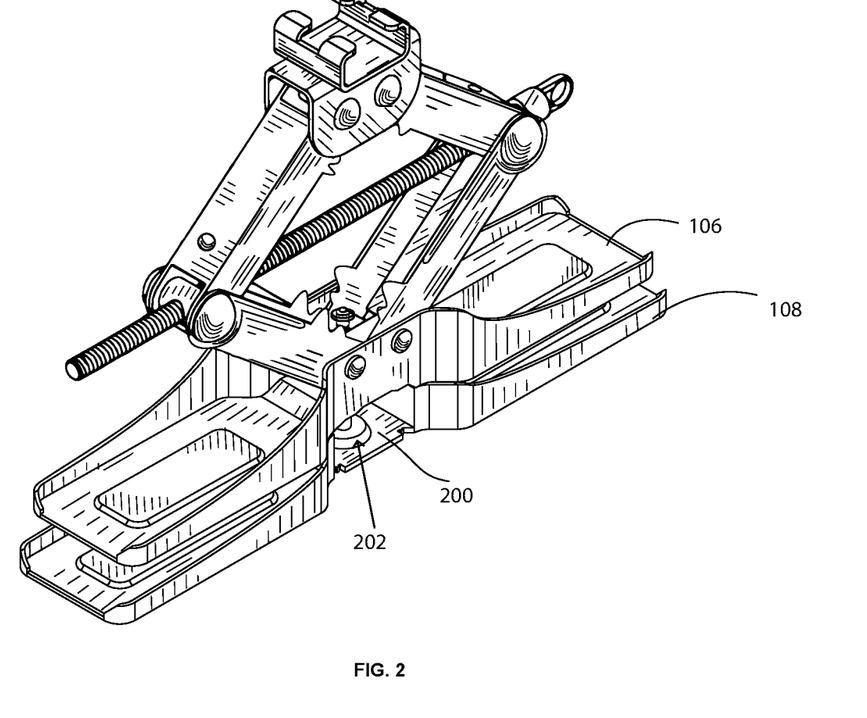
FIG. 2 is a perspective view of the expandable car jack of FIG. 1 with the base in a stacked vertical configuration, according to an example embodiment.
Figure 5:
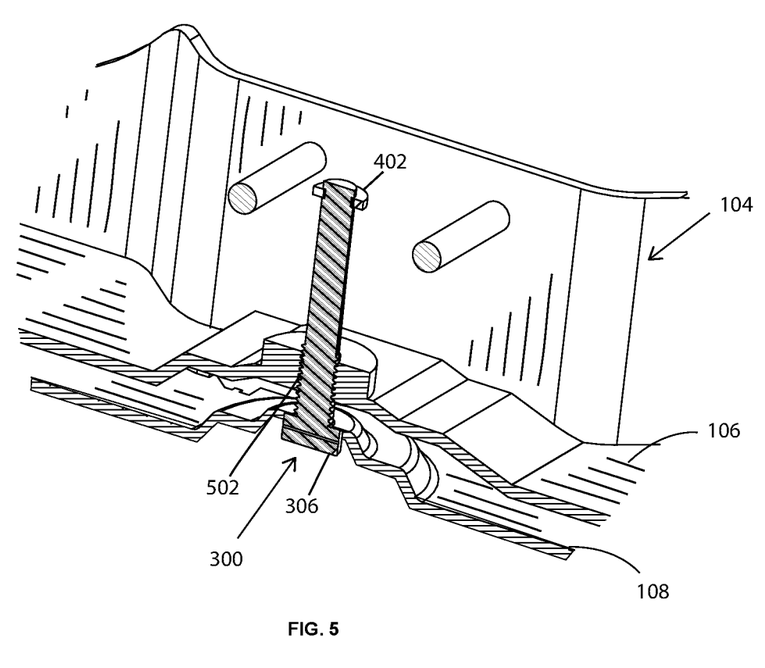
FIG. 5 is a close-up view of the base of the expandable car jack of FIG. 1, showing the threaded base support coupler in a first coupling position, according to an example embodiment.

Referring now to FIG. 2, a perspective view of the expandable jack is depicted, according to an exemplary embodiment. A base support coupler 200 is in proximate and/or direct contact with the base support members 106, 108, in which base support coupler 200 is designed and configured to mechanically maintain retention and alignment of the base support members 106 and 108 in the first position regardless of the base support members 106, 108 being in a perpendicular or parallel configuration. In some embodiments, each of the base support members 106, 108 further include an indention 202 configured to serve as a junction point between the base support members 106, 108. In a preferred embodiment, base support coupler 200 is configured to occupy at least a portion of the indention 202 of the one or more base support members 106, 108. In some embodiments, the indentions 202 are complementary in addition to being shaped and sized to receive one another, allowing base support coupler 200 to maintain the affixing of the base support members 106, 108 in a manner in which there is minimal distance between the base support members 106, 108 in the coupled position (as best depicted in FIG. 5).

In some embodiments, the base support members 106, 108 are identical shape, length, and width in which each of the base support members support a plurality of various sized grooves and/or contours. In some embodiments, the base support members 106, 108 may include one or more recesses to allow for nested fitting of the entire body of the second base support member 108 within the first base support member 106 (as depicted best in FIG. 2). In a preferred embodiment, indention 202 is centrally allocated along the body of the base support members 106, 108, wherein the dimensions of indention 202 is subject to the overall size of the base support members 106, 108. The allocation of indention 202 allows at least a central portion of the second base support member 108 to perfectly fit into indention 202 of the first base support member 106 resulting in a nested-like formation wherein a portion of the body of first base support member 106 may be situated within indention 202 of the second base support 108. As a result, the base support members 106, 108 in the perpendicular configuration are coplanar with the applicable surface that expandable base 104 is situated upon; however, in the parallel configuration only second base support member 108 makes contact with the applicable surface that expandable base 104 is situated upon, due to the nested-like formation of the support members 106, 108 (as depicted best in FIG. 7). In other words, when base support members 106, 108 are in a vertically stacked parallel configuration in the first coupling position, the topmost base support member 106 is nested in the bottommost base support member 108, which provides roughly the same support as prior art jacks.

Figure 3:
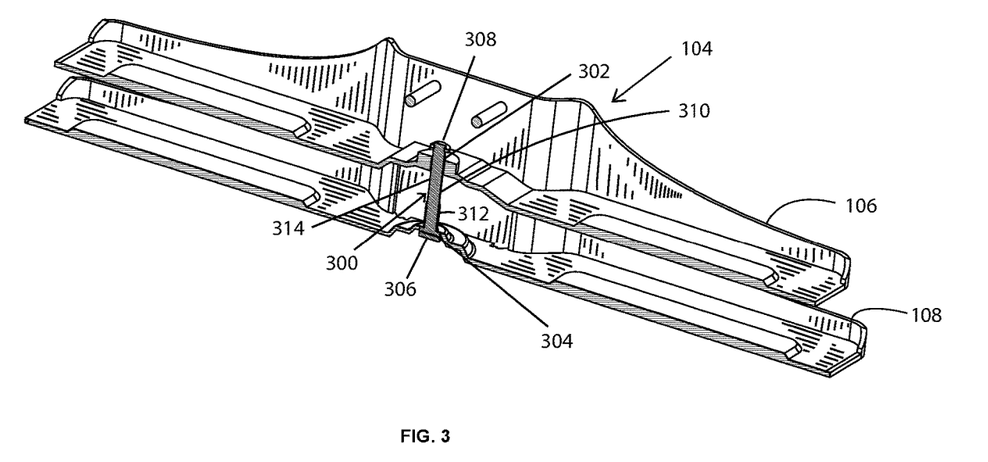
FIG. 3 is a cross-sectional view of the base of the expandable car jack of FIG. 1, with the base in the stacked configuration and a threaded base support coupler in a second coupling position, according to an example embodiment.

Referring now to FIG. 3, a cross sectional view of the base 104 of the expandable jack 100 is illustrated according to an exemplary embodiment. In some embodiments, ideally each base support member 106, 108 includes at least an aperture configured to be penetrated by a base support coupler 300. For example, the first base support member 106 may include a first base support member aperture 302 and the second base support member 108 may include a second base support member aperture 304, wherein base support coupler 300 may include a head 306, a foot 308, and a length 310 extending from head 306 to foot 308. In some embodiments, foot 308 is configured to be proximate to first base support member aperture 302 and head 306 is configured to be proximate to second base support member aperture 304. As depicted, base support coupler 300 is in a second coupling position allowing free movement of base support coupler 300 between the parallel alignment and the perpendicular alignment; in particular, by lack of affixed engagement of base support coupler 300 with apertures 302 and 304. In some embodiment, the dimensions of foot 308 are configured to be larger than base support member apertures 302 and 304 forcing length 310 to be confined between the base support members 106, 108 and allowing the base support members 106, 108 to vertically traverse base support coupler 300 when base support coupler 300 is not in the first coupling position. In some embodiments, length 310 includes at least a threaded wall section 312 and an unthreaded wall section 314, wherein threaded wall section 312 is configured to be integrated with one or more complementary threaded members associated with first base support member aperture 302. However, in the second coupling position there is no engagement between threaded wall section 312 and apertures 302 and 304 which allows at least base support coupler 106 to vertically traverse base support coupler 300 within the range from contact with base support coupler 108 in the vertically stacked position up to foot 308. It is to be understood that the purpose of vertical traversing of base support member 106 allows the range of rotational movements of base support member 106 relative to base support coupler 300 when base support member 106 is not in direct contact with base support member 108 (as depicted in FIG. 3). Base support member 106 not being in engaged contact with base support member 108 in the vertically stacked parallel configuration or the perpendicular configuration allows 360° rotation of base support member 108 relative to base support coupler 300 when in the second coupling position. As described herein, engaged contact is the integrated coupling of the threads of base coupler support 300 to the complementary threads of one or more of the aforementioned apertures. In some embodiments, the second coupling position allows rotational movement of first base support 106; however, this rotational movement may be limited in respect to the rotation of base support coupler 300. The second coupling position seeks to allow placement of alignment of first base support 106 with respect to second base support 108.

Figure 4:
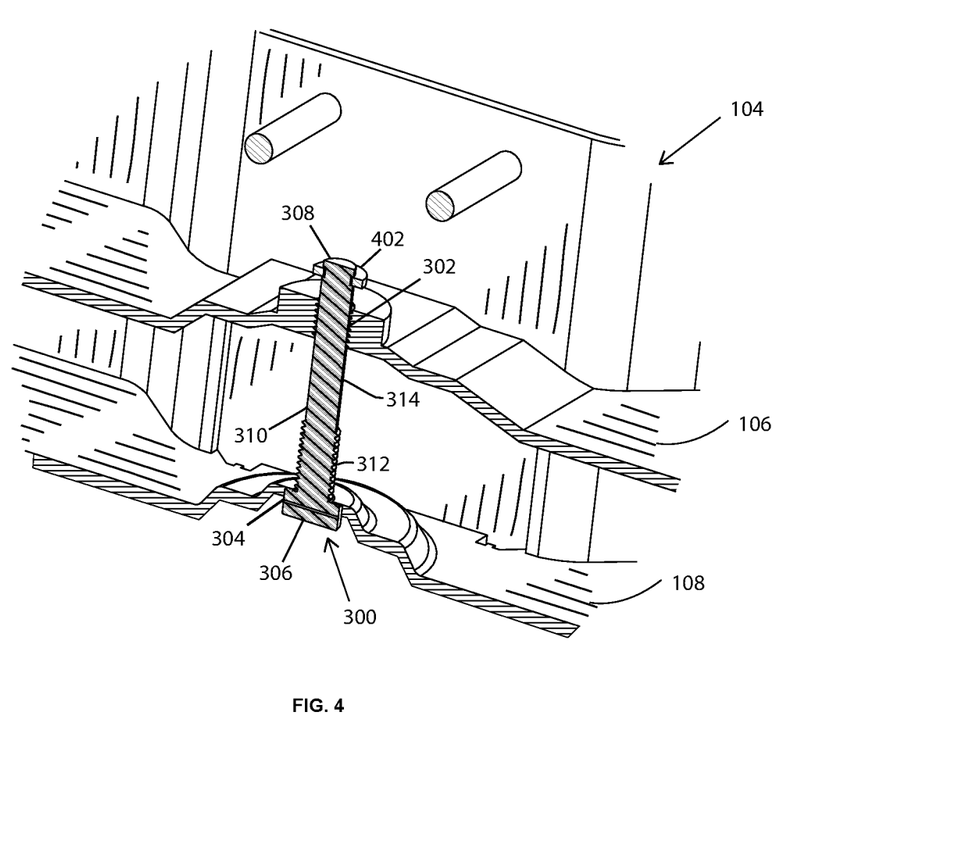
FIG. 4 is a close-up view of the base of the expandable car jack of FIG. 3, showing the threaded base support coupler in the second coupling position, according to an example embodiment.

Referring now to FIG. 4, a partial cross-sectional view of the base 104 of FIG. 3 is depicted, accordingly to an exemplary embodiment. It is to be understood that foot 308 of the base support coupler 300 includes a lip 402 configured to have a width and/or a circumference of greater size than aperture 302 to ensure that base support coupler 300 maintains substantially continuous contact with the base support members 106, 108. Lip 402 is configured to endure one or more strong forces and may be integrated into base support coupler 300 and/or detachably affixed to foot 308 in certain embodiments. In some embodiments, lip 402 is spaced and allocated in a manner in which aperture 302 is positioned between lip 402 and threaded wall section 312. It is to be understood that the complementary threaded members are configured to allow base support coupler 300 to securely retain the position and location of base support members 106 and 108 when base support coupler 300 is in the first coupling position, but there is little to no engaged contact in the second position. Base support member 106 moves independent from the second support member 108 so that the base support members 106, 108 can be moved into their desired position. A separation of the support members 106, 108 is illustrated in FIG. 4, where the non-threaded portion of the base support coupler 300 is configured to be within the aperture 302 but is not retained in aperture 302.

Referring now to FIG. 5, a partial cross-sectional view of base coupler 300 in the first coupling position and base support members 106 and 108 in the vertically stacked parallel configuration is depicted, accordingly to an exemplary embodiment. The purpose of this configuration is to ensure that threaded wall section 312 is coupled to aperture 302 via the integration with a series of complementary threaded members 502 configured to be allocated within the aperture 302. When base support coupler 300 is in the first coupling position, minimal to no movement of the base support members 106, 108 is possible due to the retention/engaged contact of each base support member via the tight retentive coupling of threaded wall section 312 and the complementary threaded members 502 within the aperture 302. Thus, base support coupler 300 couples with threaded wall section 312 generating a locked retention of the base support members. It is to be understood that base support coupler 300 may be a screw, nut/bolt, peg, rivet, or any other applicable mechanism for affixing. In some embodiments, second base support member aperture 304 includes complementary threaded members allowing base support coupler 300 to be affixed to both apertures 302 and 304 in the first coupling position regardless of the base support members being in the stacked vertical configuration or stacked perpendicular configuration strengthening the support for the vehicle. The length of threaded wall section 312 may be allocated based on the configuration of base support coupler 300. A longer length allows coupling of threaded wall section 312 to complementary threaded members 502 of both apertures 302 and 304 in a stacked manner as illustrated in FIG. 5.

When the base support members 106, 108 are being transitioned from a perpendicular orientation to a parallel orientation (or vice versa), the base support coupler 300 is rotated so that the threads on the threaded wall section 312 no longer engage complementary threaded members 502. Disengagement of base support coupler 300 allows the transition from the first coupling position to the second coupling position. This positions the unthreaded wall section 314 of base support coupler 300 inside the aperture 302 when the base support members are vertically traversing length 310 in the second coupling position.

It is to be understood that base support coupler 300 is configured to remain mechanically coupled to the base support members in the first and second coupling positions, and in some embodiments, base support coupler 300 cannot be removed from at least one of base support members 106, 108 altogether without a mechanical alteration due to the permanent attachment of base support coupler 300 provided by head 306 and lip 402.

Figure 6:
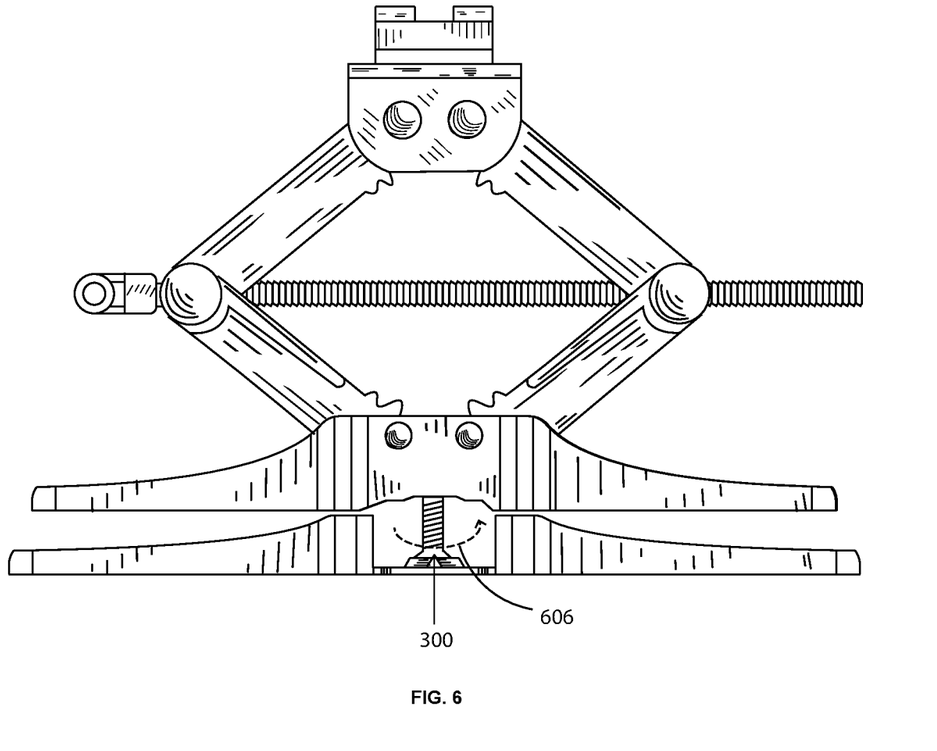
FIG. 6 is an elevational side view of the expandable car jack of FIG. 2 in the stacked vertical configuration, according to an example embodiment.

Referring now to FIG. 6, a side view of the expandable jack in a parallel configuration in the second coupling position is depicted, according to an exemplary embodiment. It is to be understood that the second coupling position supports the loose retention of the base support coupler 300 in which, due to the lack of engaged contact between the threaded wall portion of the base support coupler and complementary threaded members, the upper base support member 106 may freely vertically traverse base support coupler 300 and/or base support coupler 300 may loosely hang below the bottom surface of lower base support member 108 if lower base support member 108 is not in contact with the applicable surface stabilizing jack 100. In some embodiments, base support coupler 300 transitions from the second coupling position to the first coupling position by the user aligning a portion of threaded wall portion 312 with the applicable complementary threaded members within aperture 302 of the base support member 106. This is accomplished by the user applying a rotational force to the base support coupler, the force being represented by arrow 606 in FIG. 6. In some embodiments, base support coupler may be permanently attached to the bottommost base support member allowing positioning of the base support member 106 to be determined and adjusted based upon the user aligning threaded wall portion 312 with the aperture 302 of base support member 106 and applying rotational force 606.

Figure 7:
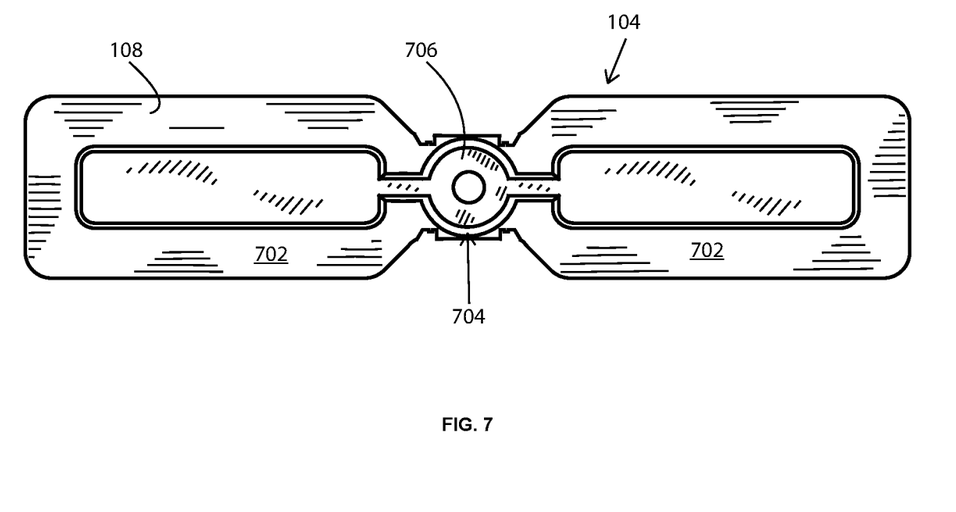
FIG. 7 is an elevational bottom view of the expandable car jack of FIG. 2 in the stacked vertical configuration, according to an example embodiment.

Referring now to FIG. 7, a bottom view of the expandable jack 100 in a parallel configuration is depicted, according to an exemplary embodiment. In some embodiments, the bottommost base support member 108 includes a bottommost planar surface 702 configured to be in direct contact with the applicable surface jack 100 is situated on. The contact between bottommost planar surface 702 and the applicable surface the expandable jack is situated on creates the stabilizing presence that supports the weight exerted on the expandable car jack 100 by the vehicle. In some embodiments, bottommost planar surface 702 is designed and configured to include a central portion housing a head 704 of the base support coupler. It is to be understood that the width and/or circumference of head 704 is configured to be larger than the size of the aperture of second base support member 108 for the same purpose lip 402 is larger than aperture 302 of base support member 106, which is to keep base support coupler 300 affixed to expandable base 104. The larger size of head 306 and foot 308 of the base support coupler 300 is to also ensure that the base support members 106, 108 are situated between the head 306 and foot 308 in which movement of the base support coupler 300 is based upon if the base support coupler 300 is in the first or second coupling position. In some embodiments, head 704 includes a gripping mechanism 706 configured to assist the user with applying screwing and unscrewing forces to the base support coupler 300 (switching between the first and second coupling positions) in addition to assist the user with adjusting the position of the base support coupler 300 when the base support coupler 300 is in the second coupling position. Gripping mechanism 706 may be a ring-shaped, semi-circular shaped, or any other applicable graspable configuration configured to support rotational forces applied to the base support coupler in order to support transition between the first and second coupling positions.

Figure 8:
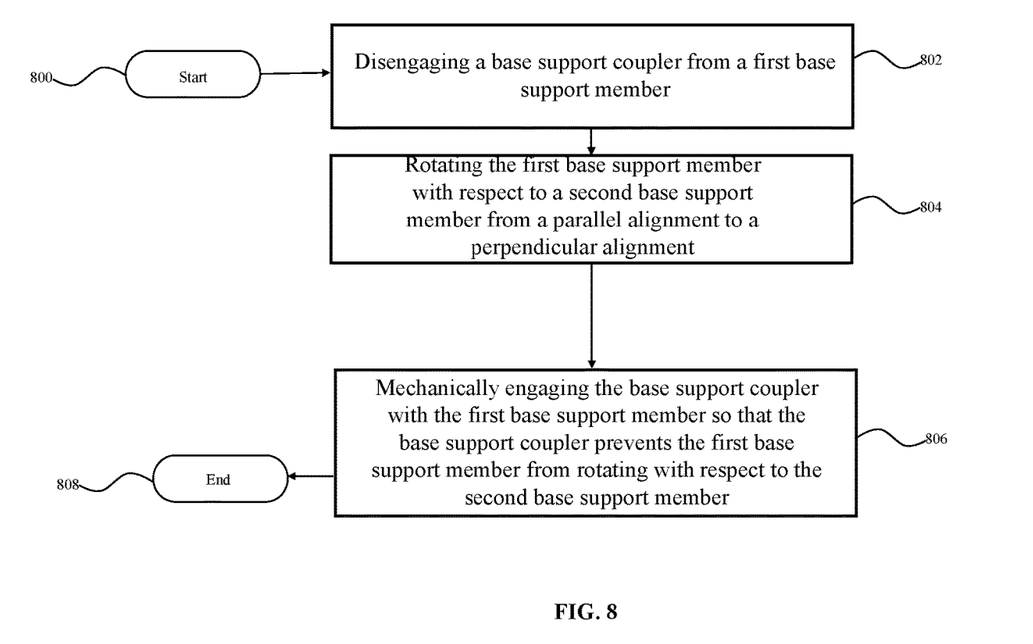
FIG. 8 is a flow chart diagram illustrating an exemplary method for utilizing an expandable car jack, according to an example embodiment.

Referring now to FIG. 8, an exemplary method for utilizing jack 100 is depicted, according to an example embodiment. The process begins at step 800 and moves to step 802 where a user removes jack 100 from a jack storage space, which is usually in the trunk or rear portion of a vehicle. In its storage configuration, the first base support member 106 and the second base support member are nested inside one another and aligned parallel to one another. In addition, base support coupler 300 is in the first coupling position; thus, requiring the user to actively disengage base support coupler 300 from at least one of base support member 106,108. Alternatively, base support coupler 300 must be disengaged in order to allow rotating of first base support member 106 with respect to second base support member 108 in the instance where first base support member 106 is transitioning from perpendicular alignment to parallel alignment. In step 804, the user ensures threaded wall portion 312 of the base support coupler 300 are disengaged from aperture 302 of base support member 106, which is typically accomplished by disengaging base support coupler 300, but the invention is not so limited. The disengagement results in first base support member 106 being rotatable with respect to second base support member 108 from the parallel alignment to the perpendicular alignment. In step 806, the user mechanically engages base support coupler 300 with first base support member 106 so that base support coupler 300 is in the first coupling position preventing first base support member 106 from rotating with respect to second base support member 108. It is to be understood that the base support member 300 is able to participate in the engaged contact with at least one of base support member 106, 108 via integration of threaded wall section 312 complementary threaded members 502. At step 808, the process ends allowing expandable base 104 to raise vehicle lifting assembly 102 to a plurality of heights based on the amount rotational force applied to screw 122.

The claims appended hereto are meant to cover all modifications and changes within the scope and spirit of the present invention.

What is claimed is:

1. A method of manufacturing an expandable car jack, the method comprising:
   aligning an aperture centrally disposed in a first base support member with an aperture centrally disposed in a second base support member, wherein the first base support member and the second base support member are configured to nest together at a bottom of a hinge assembly of the expandable car jack in a parallel alignment and in a perpendicular alignment;
   inserting a portion of a base support coupler through the apertures in the first base support member and the second base support member, wherein the base support coupler is a bolt having a head and a foot and having a length between the head and the foot, wherein a first threaded portion of the length adjacent the head comprises threads, a second threaded portion of the length adjacent the foot compromises threads, and there is an unthreaded portion of the length between the first and second portions that is not threaded; and coupling a capture member to the base support coupler, the capture member having a dimension that is larger than the apertures in the first base support member and the second base support member.

2. The method of claim 1, further comprising:
longitudinally aligning the first base support member with the second base support member; and nesting the first base support member and the second base support member together by vertically stacking the first base support member and the second base support member.

3. The method of claim 1, further comprising:
perpendicularly aligning the first base support member with the second base support member; and nesting the first base support member and the second base support member together by vertically stacking a central portion of the first base support member and a central portion of the second base support member.

4. The method of claim 1, wherein the second base support member includes a bottom planar surface.

5. A method of using an expandable car jack, the method comprising:
disengaging a base support coupler from a first base support member;

rotating the first base support member with respect to a second base support member from a parallel alignment to a perpendicular alignment; and mechanically engaging the base support coupler with the first base support member so that the base support coupler prevents the first base support member from rotating with respect to the second base support member; and wherein the base support coupler is a bolt having a head and a foot and having a length between the head and the foot, wherein a first threaded portion of the length adjacent the head comprises threads, a second threaded portion of the length adjacent the foot compromises threads, and an unthreaded portion of the length between the first and second portions is not threaded.

6. The method of claim 5, further comprising:
subsequent to rotating the first base support member with respect to the second base support member from the parallel alignment to the perpendicular alignment, disengaging the base support coupler from the first base support member;

rotating the first base support member with respect to the second base support member from the perpendicular alignment to the parallel alignment; and engaging the base support coupler to the first base support member.

7. The method of claim 5, further comprising:
lifting, via a lifting mechanism, an upper lifting member to a plurality of raised height positions above the first base support member and the second base support member.

8. A method of using an expandable car jack, the expandable car jack having a hinged section and a base section at a bottom of the hinged section, the base section including a base support coupler that passes through a first base support member and a second base support member, the method comprising:
disengaging a first threaded portion of the base support coupler from a first base support member, wherein a second threaded portion of the base support coupler is engaged with the second base support member;

rotating the first base support member with respect to a second base support member from a parallel alignment to a perpendicular alignment;

while the first base support member and the second base support member are in the perpendicular alignment, moving the second base support member into a nested configuration with the first base support member; and mechanically engaging the second threaded portion of the base support coupler with the first base support member so that the base support coupler prevents the first base support member from rotating with respect to the second base support member.

* * * * *